(12) United States Patent
Suzuki

(10) Patent No.: US 10,249,074 B2
(45) Date of Patent: Apr. 2, 2019

(54) MEDICAL IMAGE PROCESSING DEVICE, MEDICAL IMAGE PROCESSING METHOD AND COMPUTER READABLE MEDIUM FOR DISPLAYING COLOR VOLUME RENDERED IMAGES

(71) Applicant: ZIOSOFT, INC., Tokyo (JP)

(72) Inventor: Takahiro Suzuki, Tokyo (JP)

(73) Assignee: ZIOSOFT, INC., Tokyo (JP)

( * ) Notice: Subject to any disclaimer, the term of this patent is extended or adjusted under 35 U.S.C. 154(b) by 0 days.

(21) Appl. No.: 15/095,358

(22) Filed: Apr. 11, 2016

(65) Prior Publication Data
US 2016/0307358 A1 Oct. 20, 2016

(30) Foreign Application Priority Data
Apr. 16, 2015 (JP) .................................. 2015-084369

(51) Int. Cl.
*G06T 15/08* (2011.01)
(52) U.S. Cl.
CPC .......... *G06T 15/08* (2013.01); *G06T 2210/41* (2013.01)
(58) Field of Classification Search
None
See application file for complete search history.

(56) References Cited

U.S. PATENT DOCUMENTS

| 6,611,615 B1* | 8/2003 | Christensen | ............. G06T 5/20 128/922 |
| 2009/0174729 A1 | 7/2009 | Matsumoto | |
| 2012/0177258 A1* | 7/2012 | Hakl | ....................... G06T 15/08 382/128 |
| 2013/0053648 A1* | 2/2013 | Abovitz | ................. A61B 90/30 600/249 |

FOREIGN PATENT DOCUMENTS

| JP | H06-189952 A | 7/1994 |
| JP | 2009-160306 A | 7/2009 |

OTHER PUBLICATIONS

Japanese Office action issued in Patent Application No. JP-2015-084369 dated Nov. 20, 2018.

* cited by examiner

*Primary Examiner* — Said Broome
(74) *Attorney, Agent, or Firm* — Pearne & Gordon LLP

(57) ABSTRACT

A medical image processing device includes a port, a user interface, a processor and a display. The port acquires volume data of a biological body. The user interface receives designation of two or three regions in the volume data. The processor generates a color volume rendering image based on the volume data and the two or three regions. The display displays the color volume rendering image. The two or three regions overlap each other on a virtual ray on at least one point in the color volume rendering image. The color volume rendering image has a feature that, the color volume rendering image is separable to two or three volume rendering images corresponding to the two or three regions, by a reversible transformation.

22 Claims, 9 Drawing Sheets

MEDICAL IMAGE PROCESSING DEVICE, MEDICAL IMAGE PROCESSING METHOD AND COMPUTER READABLE MEDIUM FOR DISPLAYING COLOR VOLUME RENDERED IMAGES

CROSS-REFERENCE TO RELATED APPLICATION

This application claims priority based on Japanese Patent Application No. 2015-084369, filed on Apr. 16, 2015, the entire contents of which are incorporated by reference herein.

BACKGROUND OF THE INVENTION

1. Field of the Invention

The present invention relates to a medical image processing device, a medical image processing method, and a computer readable medium.

2. Related Art

In the related art, a volume rendering method is known as a method of acquiring a three-dimensional image in an object. In the volume rendering method, by projecting a virtual ray voxels in a volume data from a virtual start point, an image is projected to a projection plane and the volume data is visualized. Hereinafter, an image acquired using the volume rendering method is also referred to as a volume rendering image.

The volume rendering method includes a maximum intensity projection (MIP) method and a ray casting method.

In the MIP method, a maximum value of intensity of voxels on a virtual ray is acquired, this value is mapped on the projection plane, and the volume data is visualized. Hereinafter, an image acquired using the MIP method is also referred to as an MIP image.

In the ray casting method, sampling points are selected at constant intervals along a path of a virtual ray, voxel values of voxels at the sampling points are acquired, and a reflected ray is accumulated while attenuating the virtual ray at the sampling points, whereby the volume data is visualized. Hereinafter, an image acquired using the ray casting method is also referred to as a ray casting image.

In the related art, a device that distinguishes organs in a biological body, allocates different colors to the organs, and generates an MIP image is known as a medical image processing device that generates an MIP image (for example, see US 2012/0177258 A).

In the related art, a device that distinguishes organs in a biological body, allocates different colors to the organs, and generates a ray casting image is known as a medical image processing device that generates a ray casting image (for example, see JP-A-2009-160306).

SUMMARY OF THE INVENTION

In the image generating devices described in US 2012/0177258 A and JP-A-2009-160306, when plural regions including an organ or the like are present on a single virtual ray, it is difficult to simultaneously display the plural regions on the virtual ray. Accordingly, a user has a difficulty in visually recognizing plural regions on a virtual ray. That is, objects overlapping in the depth direction of an image cannot be simultaneously displayed accurately. In the related art, objects overlapping in the depth direction have been simultaneously displayed by translucent rendering, but image quality thereof is not satisfactory.

The present invention is made in consideration of the above-mentioned circumstances and an object thereof s provide a medical image processing device, a medical image processing method, and a medical image processing program that can improve visibility of plural regions on a virtual ray in volume data.

A medical image processing device includes a port, a user interface, a processor and a display. The port acquires volume data of a biological body. The user interface receives designation of two or three regions in the volume data. The processor generates a color volume rendering image based on the volume data and the two or three regions. The display displays the color volume rendering image. The two or three regions overlap each other on a virtual ray on at least one point in the color volume rendering image. The color volume rendering image has a feature that, the color volume rendering image is separable to two or three volume rendering images corresponding to the two or three regions, by a reversible transformation.

A medical image processing method in a medical image processing device, includes: acquiring volume data of a biological body; receiving designation of two or three regions in the volume data; generating a color volume rendering image based on the volume data and the two or three regions; and displaying the color volume rendering image. The two or three regions overlap each other on a virtual ray on at least one point in the color volume rendering image. The color volume rendering image has a feature that, the color volume rendering image is separable to two or three volume rendering images corresponding to the two or three regions, by a reversible transformation.

A non-transitory computer readable medium which stores program for causing a medical image processing device to execute operations includes: acquiring volume data of a biological body; receiving designation of two or three regions in the volume data; generating a color volume rendering image based on the volume data and the two or three regions; and displaying the color volume rendering image. The two or three regions overlap each other on a virtual ray on at least one point in the color volume rendering image. The color volume rendering image has a feature that, the color volume rendering image is separable to two or three volume rendering images corresponding to the two or three regions, by a reversible transformation.

According to the present invention, it is possible to improve visibility of plural regions on a virtual ray in volume data.

BRIEF DESCRIPTION OF THE INVENTION

DETAILED DESCRIPTION OF THE INVENTION

Hereinafter, embodiments of the present invention will be described with reference to the accompanying drawings.

Circumstances Leading to Embodiments

In the technique described in US 2012/0177258 A, only information of one region is acquired from a single pixel in an MIP image. For example, when a red region, a green region, and a blue region overlap on a virtual ray, the red, green, or blue region is selected. In this case, a user cannot grasp the non-selected regions and has a difficulty in recognizing plural regions on the virtual ray from the acquired image.

In the technique described in JP-A-2009-160306, a part subjected to translucent processing using the ray casting method is displayed in a translucent state and thus an image is blurred. Accordingly, when a translucent part and a non-translucent part overlap on a virtual ray, an image on the virtual ray is blurred and reliability of the image decreases.

A medical image processing device, a medical image processing method, and a medical image processing program that can improve visibility of plural regions on a virtual ray in volume data will be described below.

In the present invention, a medical image processing device includes at least one port, at least one user interface, at least one processor and at least one display. The port acquires volume data of a biological body. The user interface receives designation of two or three regions in the volume data acquired by the port. The processor generates a color volume rendering image based on the acquired volume data and the designated two or three regions. The display displays the color volume rendering image generated by the processor. The two or three regions overlap each other on a virtual ray on at least one point in the color volume rendering image. The processor performs a reversible transformation on the color volume rendering image such that the color volume rendering image is separable to two or three volume rendering images corresponding to the two or three regions.

First Embodiment

Figure 1:
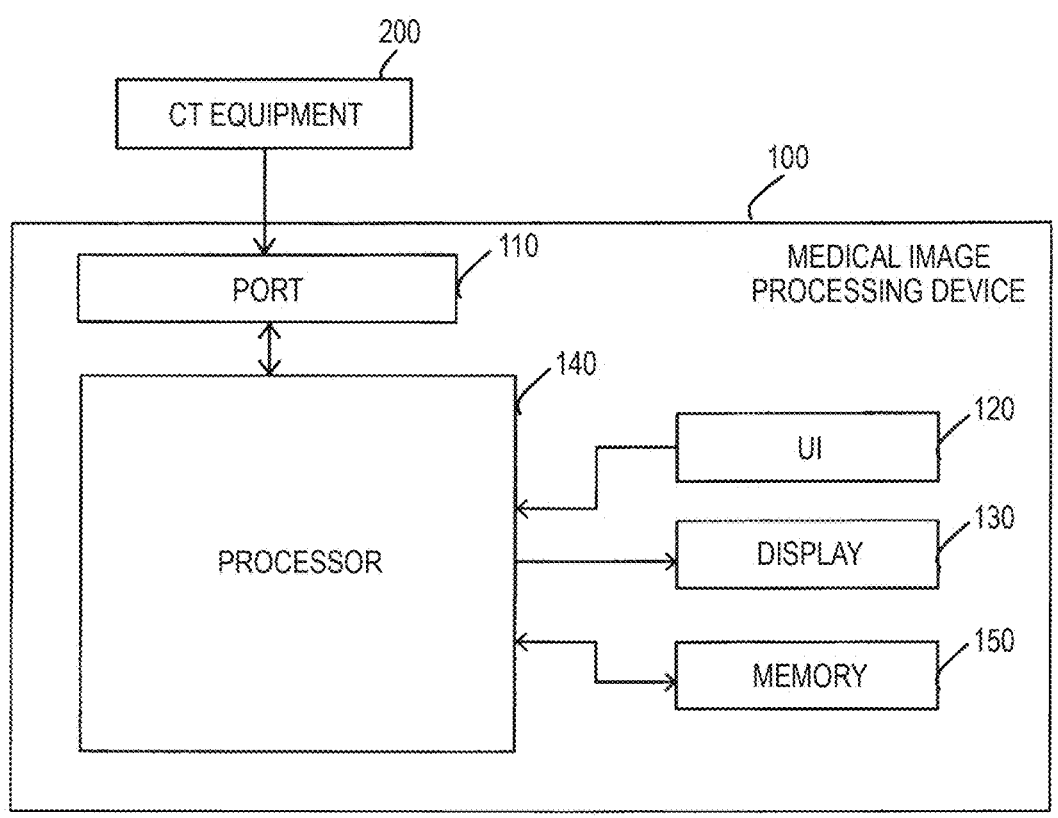
FIG. 1 is a block diagram illustrating a configuration example of a medical image processing device according to a first embodiment.

FIG. 1 is a block diagram illustrating a configuration example of a medical image processing device 100 according to a first embodiment. The medical image processing device 100 includes a port 110, a user interface (UI) 120, a display 130, a processor 140, and a memory 150. The medical image processing device 100 is connected to CT equipment 200. The medical image processing device 100 acquires volume data from the CT equipment 200 and processes the acquired volume data.

The CT equipment 200 irradiates a biological body with X-rays and captures an image (CT image) using a difference in absorption of X-rays between tissues in the biological body. Plural CT images may be captured in time series. The CT image forms volume data including information of an arbitrary position in the biological body. By capturing a CT image, voxel values (CT values) of voxels in the CT image are acquired. The CT equipment 200 transmits the volume data as the CT image to the medical image processing device 100 via a wired line or a wireless line.

The port 110 acquires the volume data as a CT image. The acquired volume data may be immediately sent to the processor 140 and may be subjected to various processes therein, or may be stored in the memory 150 and may then be sent to the processor 140 and subjected to various processes therein if necessary.

The UI 120 includes, for example, a touch panel, a pointing device, a keyboard, and a voice input. The UI 120 receives an arbitrary input operation from a user (for example, a doctor, a radiological technologist, or a radiologist) of the medical image processing device 100. The UI 120 receives, for example, an operation of designating a region and an operation of setting a luminance condition.

The display 130 includes, for example, a liquid crystal display (LCD) and displays a variety of information. The variety of information includes various color volume rendering images. The color volume rendering images are colored volume rendering images. Examples of the color volume rendering images include colored MIP images, colored ray casting images, and other colored volume rendering images.

The display 130 may display a variety of information based on the luminance condition set by the processor 140.

The memory 150 includes a read only memory (ROM) or a random access memory (RAM). The memory 150 stores a variety of information or programs. The variety of information includes, for example, volume data acquired by the port 110, images generated by the processor 140, and setting information set by the processor 140.

The processor 140 includes a central processing unit (CPU), a digital signal processor (DSP), or a graphics processing unit (GPU). The processor 140 performs various processes or control by executing a medical image processing program stored in the memory 150. The processor 140 collectively controls the constituent units of the medical image processing device 100.

The processor 140 extracts plural regions from a piece of volume data. In this case, the UI 120 receives a region designating operation from a user and information of region designation is sent to the processor 140. The processor 140 extracts a designated region from the volume data using a known method based on the information of region designation. Alternatively, the processor 140 sets a region by a user's manual operation rather than the input from the UI 120.

The extracted region includes a region of interest (ROI). The extracted region may include a region of a lesion or a tissue (for example, a bone, a blood vessel, or an organ) interesting the user and may include a region of an object (for example, a stent) which is present in the biological body.

The processor 140 generates a color volume rendering image from the volume data acquired by the port 110 based on the designated regions. In the color volume rendering image, at least two of the designated regions overlap each other in the depth direction at least one point. The processor 140 can separate volume rendering images corresponding to the designated regions from each other by reversibly transforming the color volume rendering image. The reversible transformation includes an identity transformation.

The processor 140 may generate a monochrome volume rendering image, not a colored image, in generating the color volume rendering image or may not generate the monochrome volume rendering image.

The processor 140 derives and sets luminance conditions when the color volume rendering image is displayed on the display 130. The luminance conditions may be equal to or different from each other depending on the designated regions.

The luminance conditions include, for example, a window width (ww) and a window level (wl). The window width represents a width (range) of pixel values of an image displayed on the display 130. The window level represents the central value of the width of the pixel values of the image displayed on the display 130.

The processor 140 derives the luminance conditions, for example, using AutoWindow. The AutoWindow is a process of setting the window width and the window level based on statistical information of the pixel values included in image data using a histogram. The window width of the AutoWindow is calculated by a variance value of constant×pixel values. The window level of the AutoWindow is calculated by an average value of pixel values.

An operation example of the medical image processing device 100 will be described below.

Figure 2:
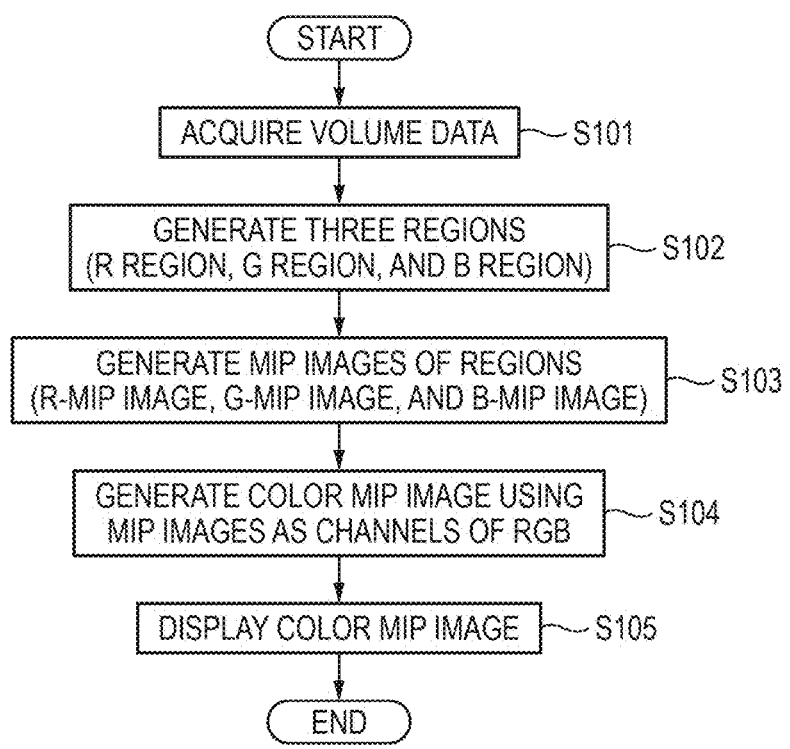
FIG. 2 is a flowchart illustrating a first operation example of the medical image processing device according to the first embodiment.

FIG. 2 is a flowchart illustrating a first operation example of the medical image processing device 100. In the first operation example, the processor 140 generates a monochrome MIP image for each region.

First, the port 110 acquires volume data from the CT equipment 200 (S101) and stores the acquired volume data in the memory 150.

The UI 120 receives designation of a region in the volume data from a user. The UI 120 sends information of the received designation of a region to the processor 140. The processor 140 extracts three regions from the acquired volume data based on the information of designation of a region (S102). Here, it is assumed that three regions are an R region, a G region, and a B region.

The processor 140 generates an MIP image from the volume data for each of the extracted three regions using means according to the related art (S103). The MIP image generated to correspond to the R region is also referred to as an R-MIP image. The MIP image generated to correspond to the G region is also referred to as a G-MIP image. The MIP image generated to correspond to the B region is also referred to as a B-MIP image.

In S103, the processor 140 projects a virtual ray to the volume data from a pixel on a projection plane and acquires a voxel value for each region. The processor 140 calculates a maximum value of the voxel values on the same virtual ray as a projection value. Similarly, the processor 140 projects a virtual ray from a pixel on the projection plane and calculates the projection value of each voxel for each region. Accordingly, the processor 140 generates a plurality of monochrome MIP images for a plurality regions from the volume data, respectively.

The processor 140 acquires color information in the color MIP image based on the voxel values of the MIP images (the R-MIP image, the G-MIP image, and the B-MIP image) of the regions. The processor 140 combines the MIP images of the regions by mapping the acquired color information of the voxels on the projection plane, and generates a color MIP image (S104). That is, when the voxel values of the color MIP image are expressed in RGB, the processor 140 maps an R channel of RGB from the voxel values of the R-MIP image, maps a G channel of RGB from the voxel values of the G-MIP image, and maps a B channel of RGB from the voxel values of the B-MIP image. This operation is performed for each voxel of the projection plane, that is, for each voxel in the color MIP image.

The display 130 displays the color MIP image generated by the processor 140 (S105). The color MIP image may be displayed after the processor 140 performs an affine transformation on the color MIP image.

In the process illustrated in FIG. 2, the processor 140 generates an MIP image for each region based on the projection information. The processor 140 maps the color information of the MIP images to generate the color MIP image. That is, the processor 140 generates a color volume rendering image after generating a volume rendering image for each region.

In the process illustrated in FIG. 2, since the monochrome MIP images acquired by the means according to the related art are used, it is possible to simply mount the medical image processing device 100.

The processor 140 may perform a computing operation, for example, using Expression 1. In the process illustrated in FIG. 2, the processor 140 directly acquires the channels of RGB of the pixel values of the color MIP image from three MIP images (the R-MIP image, the G-MIP image, and the B-MIP image). The processor 140 may generalize the three MIP images (the R-MIP image, the G-MIP image, and the B-MIP image) into three MIP images (a ch1-MIP image, a ch2-MIP image, and a ch3-MIP image), perform a transformation thereon, and then acquire the channels of RGB of the pixel values of the color MIP image. In Expression 1, the pixel values (ch1 to ch3 in Expression 1) acquired in generating three MIP images (the ch1-MIP image, the ch2-MIP image, and the ch3-MIP image) are multiplied by a transformation matrix T (the 3×3 matrix in Expression 1) to acquire the pixel values (the values of R, G, and B in Expression 1) after the transformation. The color information includes the values of "R," "G," and "B."

(Expression 1)

$$\begin{pmatrix} R \\ G \\ B \end{pmatrix} = \begin{pmatrix} 1 & 0 & 0 \\ 0.1 & 0.4 & 0.5 \\ 0 & 0.2 & 0.8 \end{pmatrix} \begin{pmatrix} ch1 \\ ch2 \\ ch3 \end{pmatrix}$$ (Expression 1)

"ch1" is a pixel value acquired by volume rendering in a first region and is a pixel value of the ch1-MIP image herein. "ch2" is a pixel value acquired by volume rendering in a second region and is a pixel value of the ch2-MIP image herein. "ch3" is a pixel value acquired by volume rendering in a third region and is a pixel value of the ch3-MIP image herein. "R" represents a value of a red component in the color volume rendering image. "G" represents a value of a green component in the color volume rendering image. "B" represents a value of a blue component in the color volume rendering image.

Expression 1 is an expression of reversible transformation. Accordingly, the processor 140 can calculate the values of R, G, and B from the values of ch1, ch2, and ch3 using the transformation matrix T. The processor 140 can calculate the values of ch1, ch2, and ch3 from the values of R, G, and B using the transformation matrix T.

Since Expression 1 is the expression of reversible transformation, the values of ch1, ch2, and ch3 and the values of R, G, and B can be mutually transformed to each other. Accordingly, the ch1-MIP image, the ch2-MIP image, and the ch3-MIP image and the color MIP image can be transformed to each other. The ch1-MIP image, the ch2-MIP image, and the ch3-MIP image can be simultaneously separated from the color MIP image. Particularly, since a user can recall the images corresponding to the ch1-MIP image, the ch2-MIP image, and the ch3-MIP image directly from the color MIP image, the user can easily understand the relationship of region shapes which complicatedly overlap each other.

In this way, the processor 140 projects a virtual ray to the volume data and acquires the projection information for each region. The processor 140 acquires the color information based on the projection information and generates the color volume rendering image based on the color information. The processor 140 reversibly transforms the projection information and acquires the color information of the color MIP image. The projection information includes projection values. The color information includes RGB values.

Figure 3:
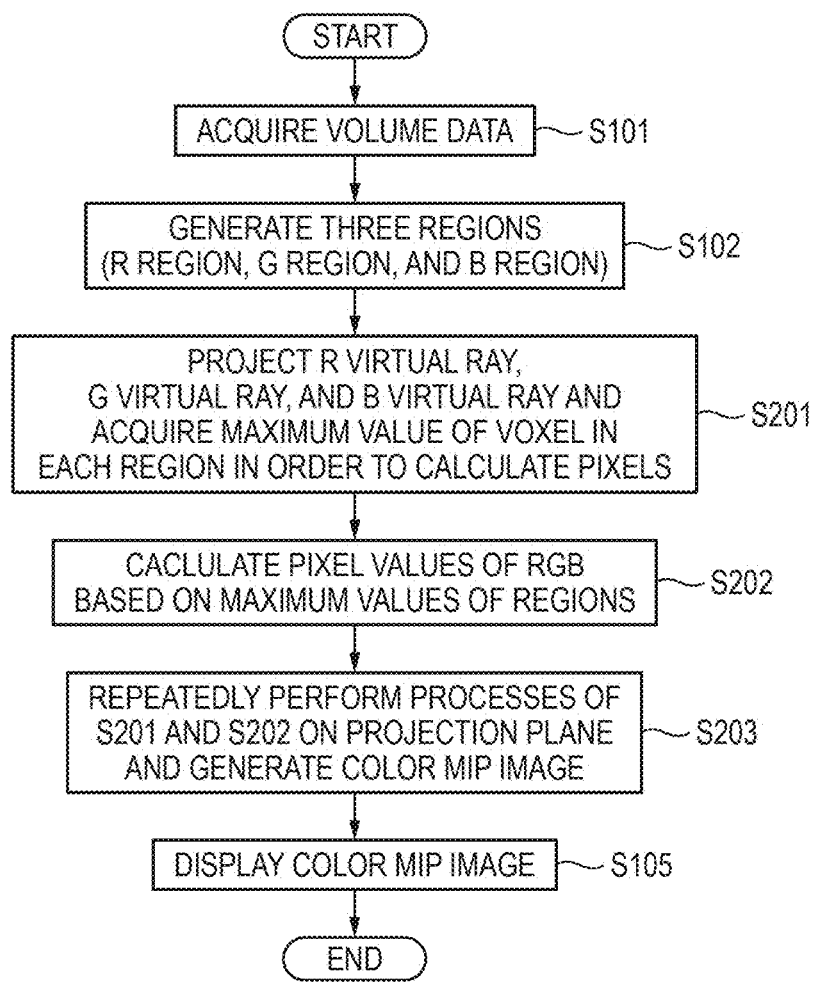
FIG. 3 is a flowchart illustrating a second operation example of the medical image processing device according to the first embodiment.

FIG. 3 is a flowchart illustrating a second operation example of the medical image processing device 100. In the second operation example, the processor 140 projects plural virtual rays (for example, three virtual rays) from a single pixel. The processor 140 may perform oversampling.

In FIG. 3, the same processes as illustrated in FIG. 2 will be referenced by the same reference signs and description thereof will not be repeated or will be made in brief.

First, the medical image processing device 100 performs the processes of steps S101 and S102.

After the process of step S102, the processor 140 projects each virtual rays to the volume data for each of the three exacted regions and acquires voxel values on the virtual rays. That is, the processor 140 projects a red virtual ray (R virtual ray), a green virtual ray (G virtual ray), and a blue virtual ray (B virtual ray) to render R region, G region and B region, respectively. The processor 140 acquires a maximum voxel value on each virtual ray as a projection value (S201). Accordingly, the projection values of the regions at one pixel on the projection plane are acquired. One pixel of the projection plane corresponds to one pixel in the color MIP image.

The processor 140 calculates, for example, Expression 1 using the maximum values of the voxels in each region which are acquired by the R virtual ray, the G virtual ray, and the B virtual ray, and calculates the values of "R," "G," and "B" (voxel values of RGB) of Expression 1 (S202). The color scheme of one pixel on the projection plane is determined by the values of "R," "G," and "B."

The processor 140 repeatedly performs the processes of S201 and S202 on other pixels on the projection plane and generates a color MIP image (S203).

Then, the medical image processing device 100 performs the process of S105.

In this way, in the process illustrated in FIG. 3, the processor 140 acquires the projection information for each region by projecting the virtual rays for the regions to each voxel. The processor 140 maps the color information of the voxels on the projection plane and generates the color MIP image. That is, the processor 140 generates the MIP image while projecting the virtual ray for each region. The processor 140 may calculate the values of R, G, and B by using the virtual rays as a ch1 virtual ray, a ch2 virtual ray, and a ch3 virtual ray and applying Expression 1 to the maximum values acquired from the ch1 to ch3 virtual rays.

In the process illustrated in FIG. 3, since the MIP image does not have to be generated for each region, it is possible to more rapidly generate the color volume rendering image.

Figure 4:
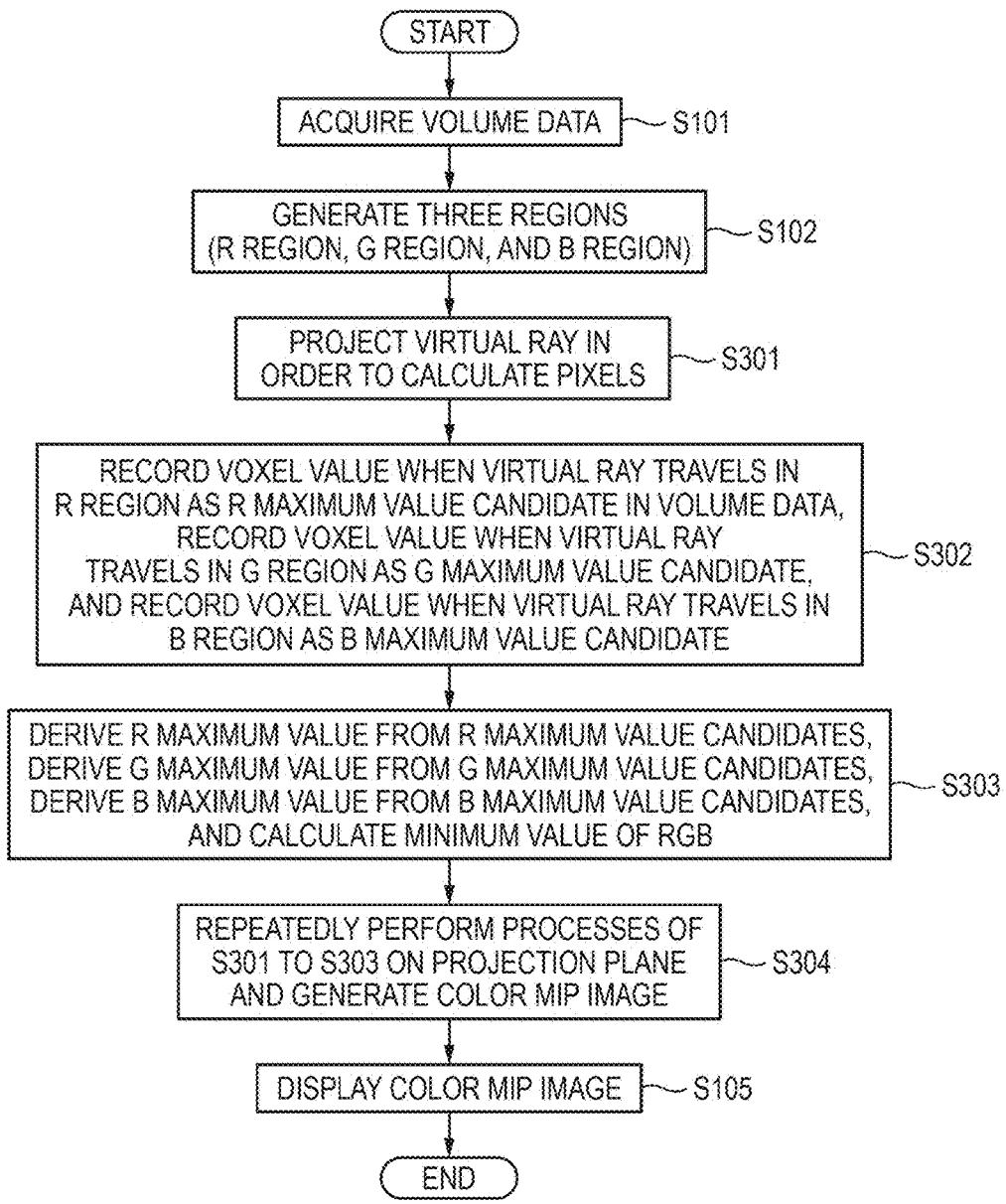
FIG. 4 is a flowchart illustrating a third operation example of the medical image processing device according to the first embodiment.

FIG. 4 is a flowchart illustrating a third operation example of the medical image processing device 100. In the third operation example, the processor 140 projects one virtual ray from a single pixel.

In FIG. 4, the same processes as illustrated in FIG. 2 or 3 will be referenced by the same reference signs and description thereof will not be repeated or will be made in brief.

First, the medical image processing device 100 performs the processes of steps S101 and S102.

After the process of step S102, the processor 140 projects one virtual ray to the volume data for the three extracted regions (S301) from a pixel on the projection plane.

When the virtual ray travels in the R region, the processor 140 stores voxel values in the R region as maximum value candidates (R maximum value candidates) in the R region in the memory 150 (S302). When the virtual ray travels in the G region, the processor 140 stores voxel values in the G region as maximum value candidates (G maximum value candidates) in the G region in the memory 150 (S302). When the virtual ray travels in the B region, the processor 140 stores voxel values in the B region as maximum value candidates (B maximum value candidates) in the B region in the memory 150 (S302).

When the virtual ray is projected to the final voxel and the voxel value of the final voxel is acquired, the processor 140 acquires the maximum value (R maximum value) of the R region from the maximum value candidates of the R region (S303). Similarly, the processor 140 acquires the maximum value (G maximum value) of the G region from the maximum value candidates of the G region (S303). Similarly, the processor 140 acquires the maximum value (B maximum value) of the B region from the maximum value candidates of the B region (S303). Accordingly, the projection values of the regions at one pixel on the projection plane are acquired.

The processor 140 calculates, for example, Expression 1 using the maximum values of the voxel values of the regions acquired by the virtual ray, and acquires the values of values of "R," "G," and "B" in Expression 1 (S303). The color scheme of one pixel on the projection plane is determined by the values of "R," "G," and "B."

The processor 140 repeatedly performs the processes of S301 to S303 on other pixel of the projection plane and generates a color MIP image (S304).

Then, the medical image processing device 100 performs the process of S105.

In this way, in the process illustrated in FIG. 4, the processor 140 projects a virtual ray for each pixel and records the value of each voxel in the memory 150 when the virtual ray travels in each region. The processor 140 acquires projection information for each region based on the voxel value of each voxel for each region which is recorded in the memory 150. The processor 140 maps the color information from the projection information of the projection plane and generates the color MIP image. That is, the processor 140 generates the color MIP image while projecting a virtual ray to the regions. The processor 140 may calculate the values of R, G, and B by using the maximum values calculated using the virtual ray as a ch1 maximum value, a ch2 maximum value, and a ch3 maximum value and applying Expression 1 to the ch1 to ch3 maximum values.

In the process illustrated in FIG. 4, since the MIP image does not have to be generated for each region, it is fast.

In the third operation example, the processor 140 derives the voxel values of the voxels and derives the projection values from the voxel values. Instead, the processor 140 may use interpolated voxel values as the voxel values of the regions on the virtual ray. That is, the voxel value at a sampling point on the virtual ray may be calculated by interpolation using the neighboring voxels. The sampling point does not have to be strictly located on the virtual ray. This is because the sampling points may be randomly dispersed in a minute distance as an artifact countermeasure.

The color volume rendering image will be described below. Here, it is assumed that monochrome MIP images are generated and combined to generate a color MIP image. As described above, the monochrome MIP images generation may be omitted.

Figure 5C:
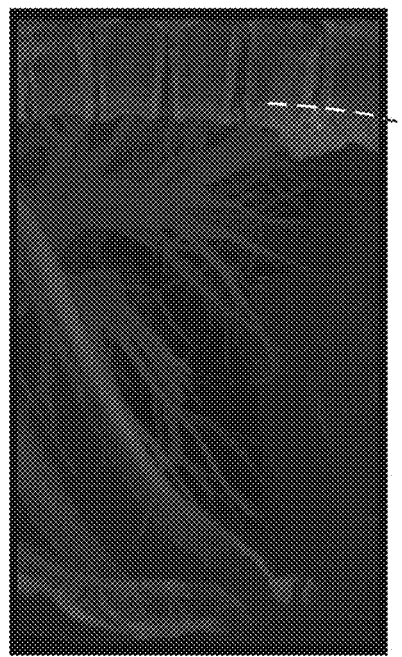
FIGS. 5A to 5D are diagrams schematically illustrating a first example of a volume rendering image according to the first embodiment.
Figure 5D:
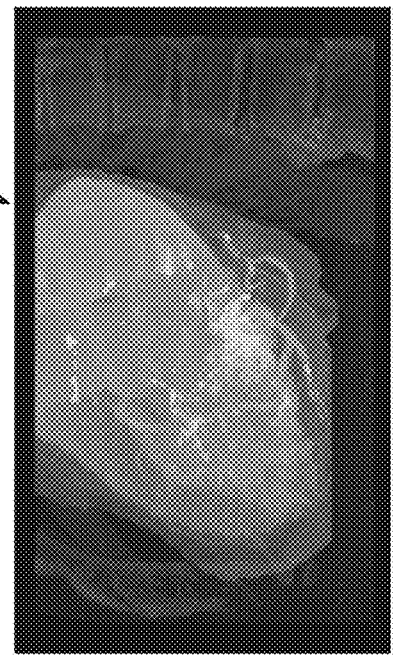
Figure 5A:
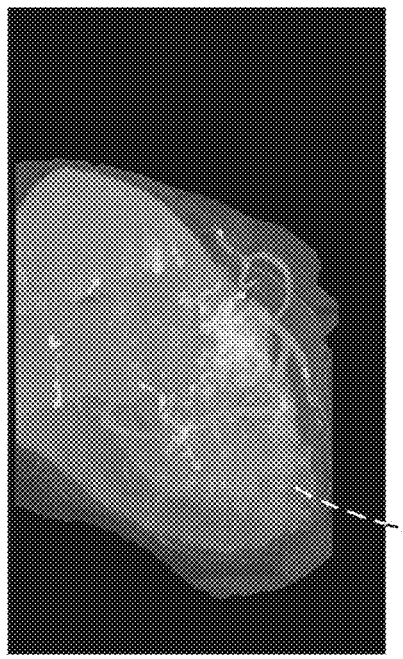
Figure 5B:
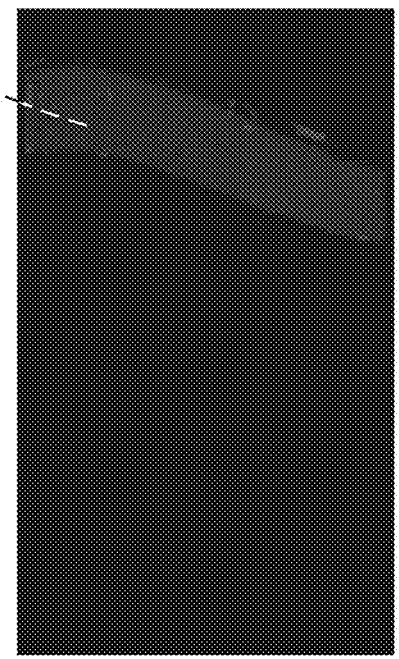

FIGS. 5A to 5D are diagrams schematically illustrating a first example of a volume rendering image. In FIGS. 5A to 5D, a color volume rendering image I1 which is generated based on volume data including the vicinity of a heart is illustrated. FIG. 5A is a diagram schematically illustrating a monochrome MIP image indicating a region of a heart D11. FIG. 5B is a diagram schematically illustrating a monochrome MIP image indicating a region of a main artery D12. FIG. 5C is a diagram schematically illustrating a monochrome MIP image indicating a region D13 other than the heart and the main artery. FIG. 5D is a diagram schematically illustrating the color volume rendering image I1 as a color MIP image.

In FIGS. 5A to 5D, the volume data includes the region of a heart D11, the region of a main artery D12, and the other region D13. The processor 140 allocates a green color (G) to the region of a heart D11 and generates a G-MIP image. The processor 140 allocates a blue color (B) to the region of a main artery D12 and generates a B-MIP image. The processor 140 allocates a red color (R) to the other region D13 and generates an R-MIP image. The processor 140 combines the MIP images to generate the color volume rendering image I1. The display 130 displays the generated color volume rendering image I1. The colors allocated to the MIP images are not limited to this example.

By comparing the color volume rendering image I1 with the monochrome volume rendering images and confirming the colors, a user can easily determine in what region a tissue is included. In the step of display in which images are presented to a user, an amount of information of the volume rendering image as two-dimensional data is smaller than an amount of information of the volume data as three-dimensional data. However, a user can easily recognize positions of tissues by confirming the color of a part of interest of the color volume rendering image I1. Particularly, when tissues to be observed overlap in the depth direction in an MIP image according to the related art, only one tissue is drawn. On the contrary, according to this embodiment, it is possible to easily distinguish the tissues of an overlapping part by paying attention to the colors.

Figure 6:
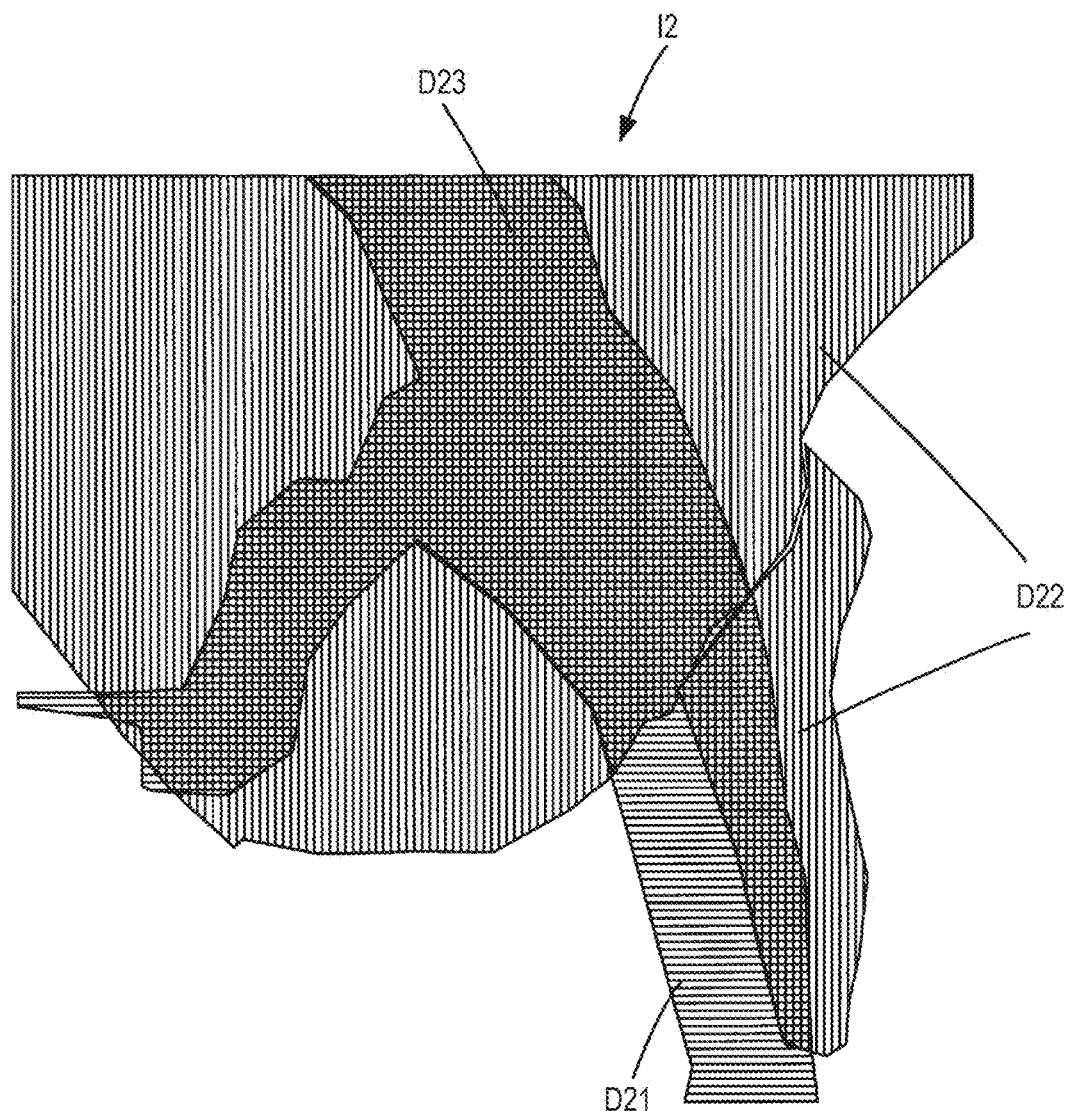
FIG. 6 is a diagram schematically illustrating a second example of a volume rendering image according to the first embodiment.

FIG. 6 is a diagram schematically illustrating a second example of a volume rendering image. In FIG. 6, a color volume rendering image I2 is illustrated which is generated based on volume data including a head, a face, and a neck.

In FIG. 6, the volume data includes a region of a carotid D21, a region of a cranial bone D22, and a region D23 in which the carotid and the cranial bone overlap. The processor 140 allocates a red color (R) to the region of a carotid D21 and generates an R-MIP image. The processor 140 allocates a green (G) to the region of a cranial bone D22 and generates a G-MIP image. The processor 140 combines the MIP images and generates the color volume rendering image I2. The overlapping region D23 is displayed as a yellow color in which the red and green colors are additively mixed. In FIG. 6, the region of a carotid D21 is expressed in a horizontal hatching pattern, the region of a cranial bone D22 is expressed in a vertical hatching pattern, and the overlapping region D23 is expressed in a vertical and horizontal pattern. This expression represents that the region D23 includes the features of the region D21 and the region D22. The display 130 displays the generated color volume rendering image I2.

In the color volume rendering image I2, a user can easily recognize a boundary of the carotid and the cranial bone based on the colors of the regions D21 to D23. Since a part in which the carotid and the cranial bone overlap reflects information of both the carotid and the cranial bone instead of reflecting information of any one of the carotid and the cranial bone, it is possible to reduce missing of information of different positions (regions) on a virtual ray. Accordingly, a user can distinguishably recognize the carotid and the cranial bone and can also recognize the overlapping thereof. The gradations of red and green allocated to the region of a carotid D21 and the region of a cranial bone D22 are drawn with high accuracy. This is because gradation information of the R-MIP image and the G-MIP image as a source in the color volume rendering image is stored. Even when the R-MIP image and the G-MIP image have intermediate luminance, the overlapping part is drawn in an ocher color corresponding to the R value and the G value based thereon. Two monochrome MIP images can be sufficiently used to generate the color volume rendering image.

Figure 7:
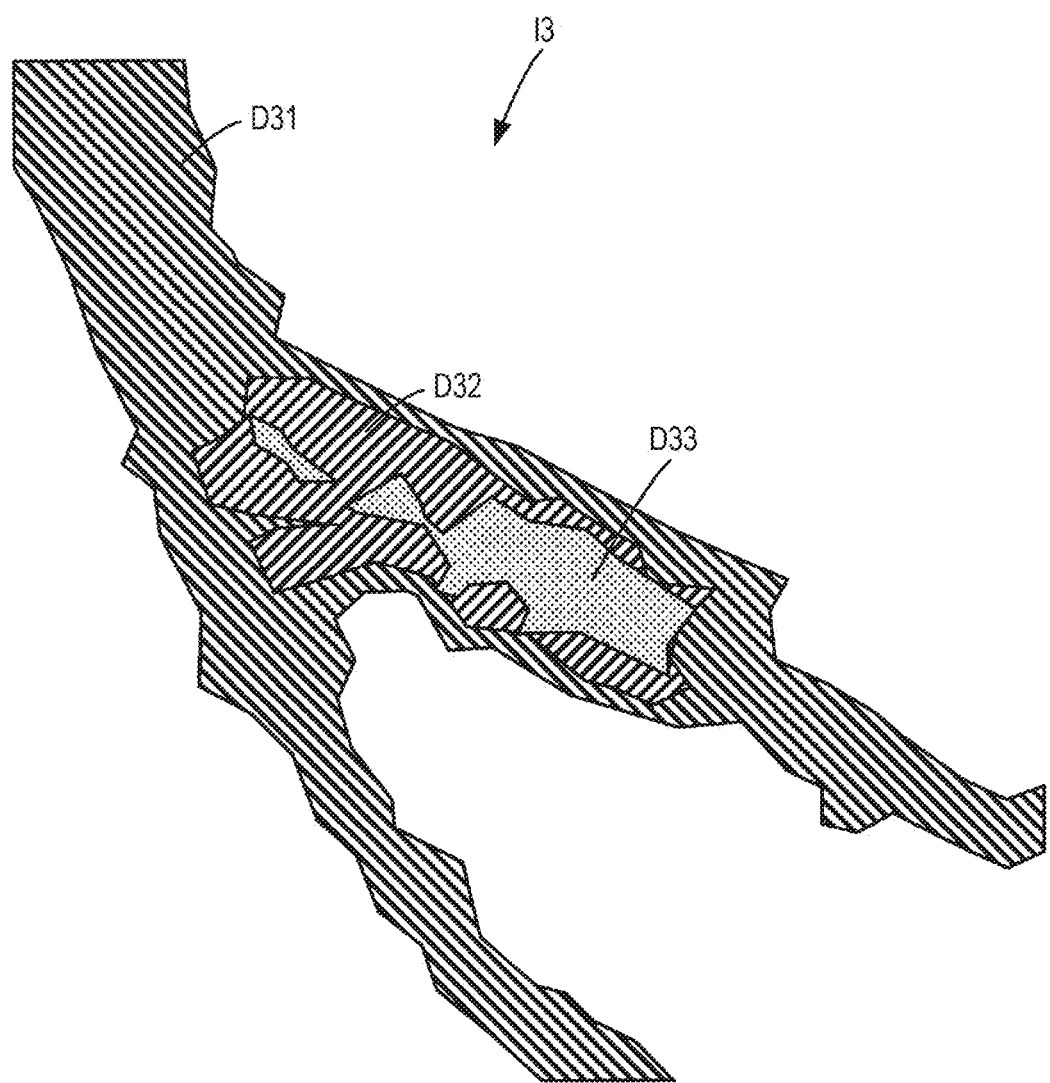
FIG. 7 is a diagram schematically illustrating a third example of a volume rendering image according to the first embodiment.

FIG. 7 is a diagram schematically illustrating a third example of a volume rendering image. In FIG. 7, a color volume rendering image I3 is illustrated which is generated based on volume data including a heart and the vicinity thereof.

In FIG. 7, the volume data includes a region of a coronary artery D31, a region of a stent D32, and a region of a bloodstream D33 flowing in the stent. The processor 140 allocates a first color (for example, red) to the region of a coronary artery D31 and generates a first color MIP image. The processor 140 allocates a second color (for example, blue) to the region of a stent D32 and generates a second color MIP image. The processor 140 allocates a third color (for example, green) to the region of a bloodstream D33 flowing in the stent and generates a third color MIP image. The processor 140 combines the MIP images to generate the color volume rendering image I3. The display 130 displays the generated color volume rendering image I3.

In the color volume rendering image I3, a user can easily recognize boundaries of the coronary artery, the stent, and the bloodstream in the stent based on the colors of the regions D31 to D33. Since the stent is inserted into the coronary artery, the coronary artery and the stent have a three-dimensional inclusion relationship. Similarly, the stent and the bloodstream in the stent have a three-dimensional inclusion relationship. Even when the regions have the inclusion relationship, it is possible to reduce missing of information of different positions (regions) on a virtual ray by distinguishing and coloring the regions. Therefore, a user can easily distinguishably recognize the coronary artery, the stent, and the bloodstream in the stent, while this is difficult for a traditional translucent surface approach.

The colors allocated to the MIP images in FIGS. 5A to 7 are not limited to the illustrated colors. Particularly, various aspects can be considered using Expression 1.

In this way, the medical image processing device 100 independently performs the operations associated with generation of the MIP images on plural regions and calculates the projection values in each region. Actually, as illustrated in FIGS. 3 and 4, the monochrome MIP images which are intermediate products may be generated or may not be generated. The medical image processing device 100 allocates three regions to color channels and displays the color volume rendering image.

Accordingly, a user can easily grasp positional relationships between tissues indicated by the volume data in the color volume rendering image. When the designation of a region is erroneous, the erroneously-designated region is displayed in a color different from a user's intention and thus the user can easily grasp the erroneous setting of a region of interest.

In the medical image processing device 100 according to this embodiment, it is possible to reduce an amount of information which is missed in generating a volume rendering image from volume data and thus to generate a color volume rendering image.

Even when designated regions overlap on a virtual ray projected to the volume data, different color information is added to the regions. Accordingly, the medical image processing device 100 can generate a color volume rendering image in which plural regions on a virtual ray can be distinguished well. Notably, the overlap means both two dimensional overlapping from a view points and three dimensional spatial overlapping.

Even when the designated regions on a virtual ray projected to the volume data have an inclusion relationship, different color information is added to the regions. Accordingly, the medical image processing device 100 can generate a color volume rendering image in which plural regions on a virtual ray can be distinguished well.

By reversibly transforming the color volume rendering image, a user can recall images corresponding to the monochrome MIP images of the regions directly from the color MIP image and can easily grasp the relationship of the region shapes which complicatedly overlap each other.

When plural regions are extracted from the volume data, it is difficult to recognize the anteroposterior relationship between the plural regions on a virtual ray or positions of the regions in the whole volume data. On the contrary, the medical image processing device 100 enables a user to easily understand the anteroposterior relationship between the plural regions on a virtual ray or positions of the regions in the whole volume data by distinguishing the regions using colors.

Since voxel values behind a reflection position in the sight direction are not generally reflected in a ray casting image, it is thus difficult to observe the inside of a biological body using the ray casting image. On the other hand, since values of an MIP image are acquired by transmitting a virtual ray, it is easy to observe the inside of the biological body using the MIP image. The ray casting image is an image which is excellent in grasping shapes and from which, for example, entwinement of blood vessels, warpage of bones, or a passage state of tubular tissues can be easily grasped. On the other hand, an MIP image is not suitable for grasping shapes. Accordingly, a usage of grasping a position of a lesion or a tissue in a biological body using an MIP image and grasping detailed information using a ray casting image can be considered. On the other hand, by using a color volume rendering image according to this embodiment, it is possible to easily carry out observation of the inside of a biological body and grasping of shapes.

When a lesion or a tissue (for example, a backbone) having a high voxel value is present in the vicinity of a region of interest, it is difficult to observe a surrounding image thereof in an MIP image. On the other hand, by setting a region different firm the region including a lesion or a tissue having a high voxel value, the surrounding image thereof can be easily observed.

Second Embodiment

In the first embodiment, an MIP image has been mainly exemplified as a volume rendering image. In a second embodiment, a ray casting image is mainly exemplified as a volume rendering image.

A medical image processing device 100 according to this embodiment has the same configuration as the medical image processing device 100 according to the first embodiment Corresponding elements will be referenced by the same reference signs and description thereof will not be repeated or will be made in brief.

An operation example of the medical image processing device 100 will be described below.

Figure 8:
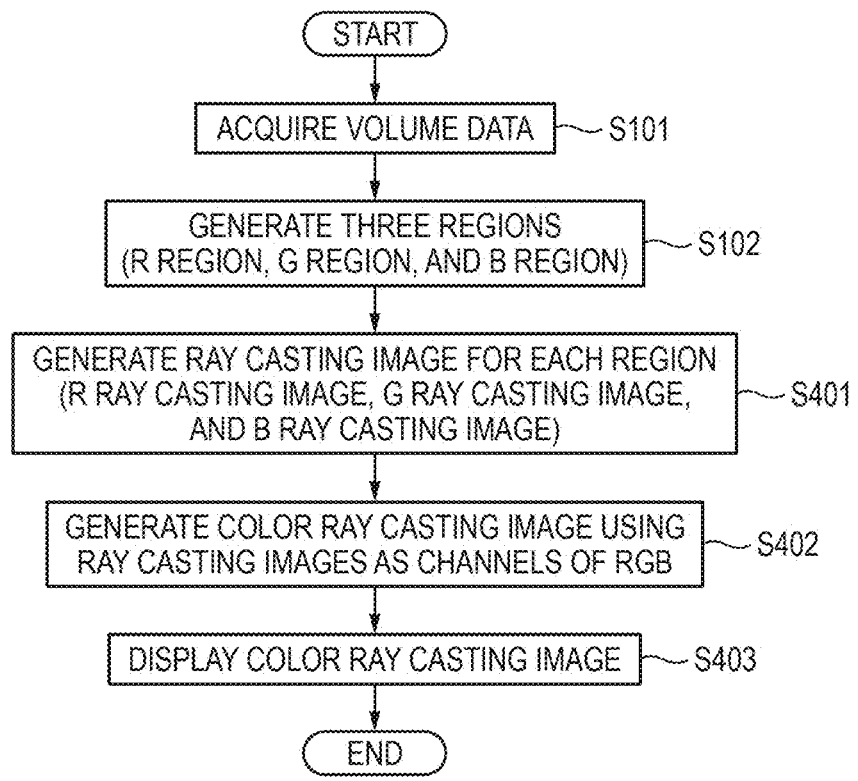
FIG. 8 is a flowchart illustrating a first operation example of a medical image processing device according to a second embodiment.

FIG. 8 is a flowchart illustrating an operation example of the medical image processing device 100. In the operation example of this embodiment, the processor 140 generates a ray casting image for each region, which corresponds to the first operation example of the first embodiment. Instead, the second operation example or the third operation example of the first embodiment may be applied to the operation according to this embodiment.

First, the medical image processing device 100 performs the processes of S101 and S102.

The processor 140 generates a monochrome ray casting image from the volume data for each of the extracted three regions (S401). The monochrome ray casting image generated to correspond to the R region is also referred to as an R ray casting image. The monochrome ray casting image generated to correspond to the G region is also referred to as a G ray casting image. The monochrome ray casting image generated to correspond to the B region is also referred to as a B ray casting image.

The processor 140 acquires color information in the color ray casting image based on the pixel values of the monochrome ray casting images (the R ray casting image, the G ray casting image, and the B ray casting image) of the regions. The processor 140 combines the ray casting images of the regions by mapping the acquired color information of the pixels on the projection plane, and generates a color ray casting image (S402). This operation is performed for each pixel of the projection plane, that is, for each pixel in the color ray casting image.

The processor 140 may refer to the monochrome ray casting images as a ch1 ray casting image, a ch2 ray casting image, and a ch3 ray casting image. The processor 140 may calculate the values of R, G, and B of the pixels in the color ray casting image by applying Expression 1 to the pixels of the ch1 to ch3 ray casting images.

The display 130 displays the color ray casting image generated by the processor 140 (S403).

A color volume rendering image will be described below.

Figure 9A:
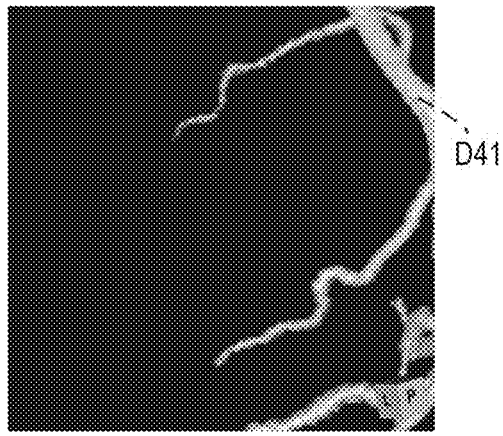
FIGS. 9A to 9D are diagrams schematically illustrating an example of a volume rendering image according to the second embodiment.
Figure 9B:
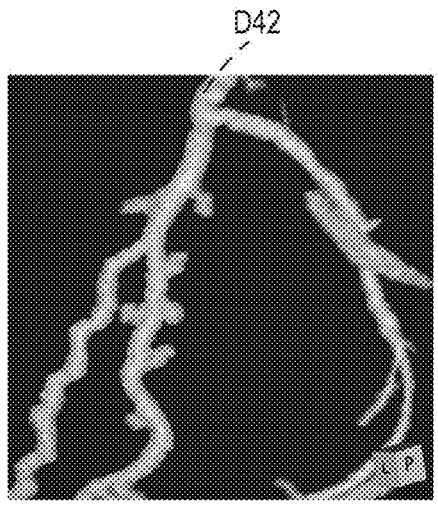
Figure 9C:
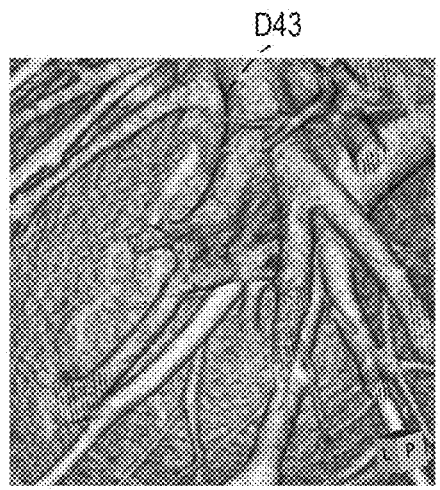
Figure 9D:
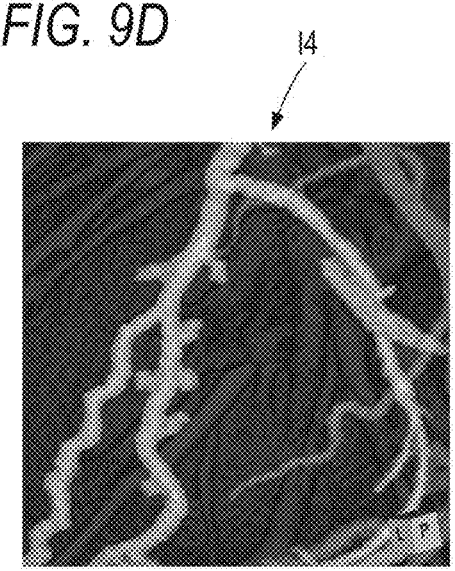

FIGS. 9A to 9D are diagrams schematically illustrating an example of a volume rendering image. In FIGS. 9A to 9D, a color volume rendering image I4 which is generated based on volume data including the vicinity of a heart is illustrated. FIG. 9A is a diagram schematically illustrating a region of a right coronary artery D41. FIG. 9B is a diagram schematically illustrating a region of a left coronary artery D42. FIG. 9C is a diagram schematically illustrating a region of a heart and peripheral blood vessels around the heart D43. FIG. 9D is a diagram schematically illustrating the color volume rendering image I4 as a color ray casting image.

In FIGS. 9A to 9D, the volume data includes the region of a right coronary artery D41, the region of a left coronary artery D42, and the region of a heart and peripheral blood vessels around the heart D43. The processor 140 allocates a red color (R) to the region of a right coronary artery D41 and generates an R ray casting image. The processor 140 allocates a green color (G) to the region of a left coronary artery D42 and generates a G ray casting image. The processor 140 allocates a blue color (B) to the region of a heart and peripheral blood vessels around the heart D43 and generates a B ray casting image. The processor 140 combines the ray casting images to generate the color volume rendering image I4. The display 130 displays the generated color volume rendering image I4.

The colors allocated to the ray casting images are not limited to this example.

Since the region of a right coronary artery D41 and the region of a left coronary artery D42 are distinguishably displayed, it is possible to suppress erroneous recognition of for example, a blood vessel into which a catheter should be inserted.

According to the medical image processing device 100 of this embodiment, the same advantages as in the first embodiment are obtained. In comparison with a case in which the translucent processing of the ray casting method according to the related art is used, the medical image processing device 100 can suppress missing of edge information which is lost through the translucent processing and can facilitate recognizing of shapes of plural tissues which are present on a virtual ray. The medical image processing device 100 can suppress a decrease in image quality due to the translucent processing. In comparison with drawing of plural regions by so-called region addition in the ray casting method according to the related art, the medical image processing device 100 can draw rear regions without hiding the rear regions and can appropriately draw plural regions which are complicatedly entwined.

Other Embodiments

The present invention is not limited to the configurations of the above-mentioned embodiments, but may employ any configuration as long as it can achieve the functions described in the appended claims or the functions of the configurations according to the above-mentioned embodiments.

In the above-mentioned embodiments, the volume data as a captured CT image is transmitted from the CT equipment 200 to the medical image processing device 100. Instead, in order to temporarily store the volume data, the volume data may be transmitted to and stored in a server over a network. In this case, if necessary, the port 110 of the medical image processing device 100 may acquire the volume data via a wired line or a wireless line or may be acquired via an arbitrary storage medium (not illustrated).

In the above-mentioned embodiments, the volume data as a captured CT image is transmitted from the CT equipment 200 to the medical image processing device 100 via the port 110. This includes a case in which the CT equipment 200 and the medical image processing device 100 are substantially treated as a single product. This includes a case in which the medical image processing device 100 is treated as a console of the CT equipment 200.

In the above-mentioned embodiments, an image is captured to generate volume data including information inside a biological body by the CT equipment 200, but an image may be captured to generate volume data by another device. Examples of another device include a magnetic resonance imaging (MRI) device, a positron emission tomography (PET) device, an angiograph device, and other modality devices. The PET device may be used in combination with another modality device.

In the above-mentioned embodiments, the processor 140 extracts three regions from the volume data. Instead, the processor 140 may extract two regions and may generate a color volume rendering image corresponding to the two regions. The processor 140 may extract four or more regions and may generate a color volume rendering image corresponding to the four or more regions.

When n (n≥4) or more regions are extracted, the processor 140 uses a 3×n matrix as the transformation matrix T of Expression 1. In this case, the operation of Expression 1 for deriving color information is an irreversible operation. When n regions are extracted, the processor 140 generates a color volume rendering image based on the volume data and n regions in the same way as in the case in which three regions are extracted. In the color volume rendering image, at least two regions overlap at least one point on a virtual ray. It is preferable that the processor 140 can separate the volume rendering images corresponding to two regions by inversely transforming the color volume rendering image.

When four regions are extracted, for example, the processor 140 may allocate white to a coronary artery as an observation target, may allocate red to blood of a heart and a main artery, may allocate green to a myocardium, and may allocate blue to the other parts. Accordingly, the medical image processing device 100 can color the regions depending on a user's intention by coloring a part of most interest with white and coloring a part of second most interest with red.

In the above-mentioned embodiment, the processor 140 generates the color volume rendering image using Expression 1. The values of the matrix elements of the transformation matrix T in Expression 1 are examples and other values may be used. The processor 140 may generate the color volume rendering image using an expression other than Expression 1.

The processor 140 may perform an operation using Expression 2 instead of Expression 1.

$$R = ch1$$

$$G = ch2$$

$$B = \mathrm{MAX}(ch1, ch2) \hspace{2cm} \text{Expression 2}$$

Expression 2 is used when two regions are designated. Expression 2 is an expression of reversible transformation, similarly to Expression 1.

In the above-mentioned embodiments, the processor 140 generates the color volume rendering image including RGB components as color information. Instead, the processor 140 may generate a color volume rendering image including HSV components as color information. The HSV components include a hue component, a saturation component, and a brightness component. The color information is not limited to the hue component but widely includes information of color such as luminance or saturation. The processor 140 may use CMY components as the color information.

In the above-mentioned embodiments, the processor 140 generates a color MIP image in which the MIP images of the regions are colored and a color ray casting image in which the ray casting images of the regions are colored as the color volume rendering image. Instead, the processor 140 may generate a color MinIP image in which minimum intensity projection (MinIP) image of the regions are colored and a color RaySUM image in which RaySUM images of the regions are colored. The processor 140 may generate a color volume rendering image using different rendering methods for channels by combining these methods. For example, it can be considered that a pulmonary artery is drawn in an MIP image, a bronchial tube is drawn in an MinIP image, and a color volume rendering image is obtained by combination of these images.

An MinIP image is an image which is acquired by an MinIP method. In the MinIP method, the minimum luminance value of voxels on a virtual ray is acquired, and this value is mapped on the projection plane, whereby volume data is visualized. In the MinIP image, projection values are derived from plural regions in the traveling direction of the virtual ray (in the depth direction of the image) and different color information is added to the regions. Accordingly, in the color MinIP image, it is possible to suppress missing of information and blurring of the positional relationship in the anteroposterior direction (depth direction) due to limitation of the number of projection values on the same virtual ray to one.

Regarding a RaySUM image, an average value or a sum value of luminance of voxels on a virtual ray is acquired, and this value is mapped on the projection plane, whereby volume data is visualized. In the RaySUM image, projection values are derived from plural regions in the traveling direction of the virtual ray (in the depth direction of the image) and different color information is added to the regions. Accordingly, in a color RaySUM image, it is possible to suppress missing of information and blurring of the positional relationship in the anteroposterior direction (depth direction) due to limitation of the number of projection values on the same virtual ray to one. Particularly, in the color RaySUM image, since the average value or the same value is calculated, features of the voxels are averaged and it is thus difficult to reflect a part having a small voxel value (part having low luminance) in the projection values. On the other hand, in the color RaySUM image, since different colors are allocated to different regions, a user can easily recognize the features of the voxels even when the features are averaged.

In the above-mentioned embodiments, the volume rendering images corresponding to the regions are mainly monochrome images, but may be color images. That is, color images corresponding to the regions may be combined to generate a color volume rendering image. Monochrome images and color images corresponding to the regions may be combined to generate a color volume rendering image. That is, the color images corresponding to the regions may be separated from the color volume rendering images. For example, it can be considered that a ray casting image colored with green and blue and a monochrome MIP image to which red is allocated are combined using a lookup table (LUT).

In the above-mentioned embodiments, plural regions not overlapping each other are extracted from the volume data in a three-dimensional space, but a part of plural regions may overlap each other.

In the above-mentioned embodiments, the processor 140 designates regions before generating color volume data, but may additionally designate regions after generating the color volume data. Accordingly, a user can designate regions so as to obtain desired distinguishing of regions while checking the color volume data using the UI 120.

In the above-mentioned embodiments, the processor 140 may reduce the volume rendering image. In this case, the processor 140 may reduce the volume rendering images corresponding to the regions before generating the color volume rendering image. The processor 140 may reduce the color volume rendering image after generating the color volume rendering image. When the color volume rendering image is reduced before the volume rendering images are generated, the processor 140 can reduce an operational load for deriving color information.

Aspects of the Invention

A medical image processing device according to an aspect of the present invention includes a port, a user interface, a processor and a display. The port acquires volume data of a biological body. The user interface receives designation of two or three regions in the volume data. The processor generates a color volume rendering image based on the volume data and the two or three regions. The display displays the color volume rendering image. The two or three regions overlap each other on a virtual ray on at least one point in the color volume rendering image. Volume rendering images corresponding to the two or three regions are displayed in different indications, by performing a reversible transformation on the color volume rendering image to separate the color volume rendering image into corresponding regions.

According to this configuration, the medical image processing device can reduce an amount of information missed in generating a volume rendering image from the volume data and can generate a color volume rendering image. By adding different color information to plural regions on a virtual ray, the regions can be easily distinguished. Accordingly, the medical image processing device can improve visibility of plural regions on a virtual ray in volume data.

In the medical image processing device according to the aspect of the present invention, the user interface may receive designation of four or more regions in the volume data. The processor may generate a color volume rendering image based on the volume data and the four or more regions. Two or more of the regions overlap each other on a virtual ray on at least one point in the color volume rendering image. Volume rendering images corresponding to the two or more regions may be displayed in different indications, by performing an inverse transformation on the color volume rendering image to separate the color volume rendering image into corresponding regions.

According to this configuration, even when a region on a virtual ray is separated finely, the same advantages as when there are three regions are obtained. That is, the medical image processing device can reduce an amount of information missed in generating a volume rendering image from the volume data and can generate a color volume rendering image. Since images of at least two regions are acquired by inversely transforming the color volume rendering image, the regions on the virtual ray can be easily distinguished in comparison with a case in which regions are not separated finely.

In the medical image processing device according to the aspect of the present invention, the two or more regions may overlap each other in a three-dimensional space.

According to this configuration, for example, one blood vessel may be included in both a blood vessel region and a heart region. In this case, by adding mixed color information to the blood vessel when color information is added to the regions, a user can easily distinguish the regions or tissues.

In the medical image processing device according to the aspect of the present invention, the volume rendering images may include a maximum projection image.

According to this configuration, in case of voxels having relatively small projection values on a virtual ray, the projection values are calculated for each region, are reflected in the volume rendering images, and can be easily recognized by a user.

In the medical image processing device according to the aspect of the present invention, the processor may set a different luminance condition to display the color volume rendering image for each region.

According to this configuration, the medical image processing device can adjust luminance depending on a tissue or a lesion to be observed. For example, the medical image processing device can set the luminance of a region having a relatively small projection value to be slightly higher or can set the luminance of a region having a relatively large projection value to be lower, thereby causing the regions to be more visible.

In the medical image processing device according to an aspect of the present invention, the processor may set the same luminance condition to display the color volume rendering image for each region.

According to this configuration, the medical image processing device can adjust luminance without depending on a tissue or a lesion to be observed. Since the medical image processing device can set the luminance conditions of the regions together, it is possible to reduce a user's labor.

The medical image processing device according to the aspect of the present invention may further include a user interface that sets the same luminance condition. This is effective when plural regions have substantially the same composition. That is, the configuration is effective when a vein and an artery are distinguishably visualized or when a liver and other organs are distinguishably visualized.

According to this configuration, it is possible to set the luminance condition depending on a user's intention.

A medical image processing method according to an aspect of the present invention is a medical image processing method in a medical image processing device, including: acquiring volume data of a biological body; receiving designation of two or three regions in the volume data; generating a color volume rendering image based on the volume data and the two or three regions; and displaying the color volume rendering image. The two or three regions overlap each other on a virtual ray on at least one point in the color volume rendering image. Volume rendering images corresponding to the two or three regions are displayed in different indications, by performing a reversible transformation on the color volume rendering image to separate the color volume rendering image into corresponding regions.

According to this method, the medical image processing device can reduce an amount of information missed in generating a volume rendering image from the volume data and can generate a color volume rendering image. By adding different color information to plural regions on a virtual ray, the regions can be easily distinguished. Accordingly, the medical image processing device can improve visibility of plural regions on a virtual ray in volume data.

A computer readable medium according to an aspect of the present invention is a non-transitory computer readable medium which stores program for causing a medical image processing device to execute operations including: acquiring volume data of a biological body, receiving designation of two or three regions in the volume data; generating a color volume rendering image based on the volume data and the two or three regions; and displaying the color volume rendering image. The two or three regions overlap each other on a virtual ray on at least one point in the color volume rendering image. Volume rendering images corresponding to the two or three regions are displayed in different indications, by performing a reversible transformation on the color volume rendering image to separate the color volume rendering image into corresponding regions.

According to this program, the medical image processing device executing the program can reduce an amount of information missed in generating a volume rendering image from the volume data and can generate a color volume rendering image. By adding different color information to plural regions on a virtual ray, the regions can be easily distinguished. Accordingly, the medical image processing device can improve visibility of plural regions on a virtual ray in volume data.

The present invention is useful for a medical image processing device, a medical image processing method, and a medical image processing program that can improve visibility of plural regions on a virtual ray in volume data.

What is claimed is:

1. A medical image processing device comprising:
    a port that acquires volume data of a biological body;
    a user interface that receives a designation of at least two regions in the volume data, each of the regions corresponding to a different biological structure and being associated with a different color;
    a processor that generates a color volume rendering image based on the volume data and the colors associated with the at least two regions, the color volume rendering image being a two-dimensional view of the volume data flattened along a flattening direction; and
    a display that displays the color volume rendering image,
    wherein the at least two regions overlap each other when the volume data is viewed along the flattening direction such that at least one pixel of the color volume rendering image is associated with the at least two regions and different colors, and
    wherein the at least one pixel of the color volume rendering image is separable into at least two volume rendering images corresponding to the at least two regions by a reversible transformation, wherein each of the at least two volume rendering images is associated with only one of the at least two regions.

2. The medical image processing device according to claim 1,
    wherein the user interface receives a designation of four or more regions in the volume data,
    wherein the processor generates the color volume rendering image based on the volume data and the four or more regions.

3. The medical image processing device according to claim 1, wherein the at least two regions overlap each other in a three-dimensional space.

4. The medical image processing device according to claim 1, wherein the volume rendering image includes a maximum intensity projection image.

5. The medical image processing device according to claim 1, wherein the processor sets a different luminance condition to display the color volume rendering image for each region.

6. The medical image processing device according to claim 1, wherein the processor sets the same luminance condition to display the color volume rendering image for the at least two regions.

7. The medical image processing device according to claim 6, the same luminance condition is set via the user interface.

8. A method of using the medical image processing device according to claim 1, comprising:
- acquiring, at the port, the volume data of the biological body;
- receiving, at the user interface, the designation of the at least two regions in the volume data;
- generating, with the processor, the color volume rendering image based on the volume data and the colors associated with the at least two regions; and
- displaying, on the display, the color volume rendering image.

9. A non-transitory computer readable medium which stores program for causing a medical image processing device to execute operations comprising:
- acquiring volume data of a biological body;
- receiving a designation of at least two regions in the volume data, each of the regions corresponding to a different biological structure and being associated with a different color;
- generating a color volume rendering image based on the volume data and the colors associated with the at least two regions, the color volume rendering image being a two-dimensional view of the volume data flattened along a flattening direction; and
- displaying the color volume rendering image,
- wherein the at least two regions overlap each other when the volume data is viewed along the flattening direction such that at least one pixel of the color volume rendering image is associated with the at least two regions and different colors, and
- wherein the at least one pixel of the color volume rendering image is separable into at least two volume rendering images corresponding to the at least two regions by a reversible transformation, wherein each of the at least two volume rendering images is associated with only one of the at least two regions.

10. The method according to claim 8,
- wherein the received designation is of four or more regions in the volume data,
- wherein the generated color volume rendering image is based on the volume data and the four or more regions.

11. The method according to claim 8, wherein the at least two regions overlap each other in a three-dimensional space.

12. The method according to claim 8, wherein the volume rendering image includes a maximum intensity projection image.

13. The method according to claim 8, further comprising:
- setting the same luminance condition to display the color volume rendering image for the at least two regions.

14. The method according to claim 13, wherein setting the same luminance condition is performed via the user interface.

15. The method non-transitory computer readable medium according to claim 9,
- wherein the received designation is of four or more regions in the volume data,
- wherein the generated color volume rendering image is based on the volume data and the four or more regions.

16. The method non-transitory computer readable medium according to claim 9, wherein the at least two regions overlap each other in a three-dimensional space.

17. The method non-transitory computer readable medium according to claim 9, wherein the volume rendering image includes a maximum intensity projection image.

18. The method non-transitory computer readable medium according to claim 9, the operations further comprising:
- setting the same luminance condition to display the color volume rendering image for the at least two regions.

19. The method non-transitory computer readable medium according to claim 18, wherein setting the same luminance condition is performed via a user interface.

20. The medical image processing device according to claim 1, wherein a color of the at least one pixel of the color volume rendering image is a result of additively mixing the colors associated with the at least two regions.

21. The method according to claim 8, further comprising:
- additively mixing the colors associated with the at least two regions to generate the color of the at least one pixel of the color volume rendering image.

22. The non-transitory computer readable medium according to claim 9, the operations further comprising:
- additively mixing the colors associated with the at least two regions to generate a color of the at least one pixel of the color volume rendering image.

\* \* \* \* \*

UNITED STATES PATENT AND TRADEMARK OFFICE
CERTIFICATE OF CORRECTION

PATENT NO. : 10,249,074 B2  
APPLICATION NO. : 15/095358  
DATED : April 2, 2019  
INVENTOR(S) : Takahiro Suzuki Page 1 of 1

It is certified that error appears in the above-identified patent and that said Letters Patent is hereby corrected as shown below:

In the Claims

Column 20, Line 12, Claim 15, "The method non-transitory" should be -- The non-transitory --.

Column 20, Line 18, Claim 16, "The method non-transitory" should be -- The non-transitory --.

Column 20, Line 21, Claim 17, "The method non-transitory" should be -- The non-transitory --.

Column 20, Line 24, Claim 18, "The method non-transitory" should be -- The non-transitory --.

Column 20, Line 29, Claim 19, "The method non-transitory" should be -- The non-transitory --.

Signed and Sealed this  
Ninth Day of July, 2019

Andrei Iancu  
*Director of the United States Patent and Trademark Office*